(12) United States Patent
Manning

(10) Patent No.: US 6,552,444 B1
(45) Date of Patent: Apr. 22, 2003

(54) MOTOR VEHICLE CLUTCH INDICATOR LIGHT AND ACTUATOR

(75) Inventor: Jewel D. Manning, 7123 Melon Ct., Baton Rouge, LA (US) 70805-7524

(73) Assignees: Sandra Manning, Baton Rouge, LA (US); Jewel D. Manning, Baton Rouge, LA (US)

( * ) Notice: Subject to any disclaimer, the term of this patent is extended or adjusted under 35 U.S.C. 154(b) by 11 days.

(21) Appl. No.: 09/796,952

(22) Filed: Feb. 28, 2001

Related U.S. Application Data
(60) Provisional application No. 60/186,628, filed on Mar. 3, 2000.

(51) Int. Cl.[7] .................................................. B60L 1/14
(52) U.S. Cl. ...................... 307/10.8; 307/10.1; 340/467
(58) Field of Search ............................... 307/10.1, 10.8; 340/467, 468, 479

(56) References Cited

U.S. PATENT DOCUMENTS

| | | | | |
|---|---|---|---|---|
| 4,357,594 A | * | 11/1982 | Ehrlich et al. | 200/61.45 R |
| 4,806,782 A | | 2/1989 | Bernal | |
| 4,841,276 A | * | 6/1989 | Abel et al. | 307/10.8 |
| 5,258,740 A | * | 11/1993 | Viano et al. | 340/456 |
| 5,376,918 A | * | 12/1994 | Vinciguerra et al. | 340/467 |
| 5,491,466 A | * | 2/1996 | Maiocco, Sr. | 340/467 |
| 5,821,851 A | * | 10/1998 | Blackmer | 200/61.45 R |
| 5,954,150 A | * | 9/1999 | Miller et al. | 180/248 |
| 6,137,401 A | * | 10/2000 | Barrows | 192/30 W |
| 6,172,598 B1 | * | 1/2001 | Lee et al. | 116/36 |

* cited by examiner

*Primary Examiner*—Brian Sircus
*Assistant Examiner*—Sharon Polk
(74) *Attorney, Agent, or Firm*—Anderson & Morishita; Robert Ryan Morishita

(57) ABSTRACT

A device is provided for a motor vehicle of the type having a manual transmission including a clutch coupled to a clutch pedal. An actuator engaged to the clutch controls the actuation of one or more external indicator lights in response to the depression of the clutch pedal. Optionally, the system further includes a dashboard indicator light that is illuminated by the actuator upon depression of the clutch pedal.

3 Claims, 2 Drawing Sheets

MOTOR VEHICLE CLUTCH INDICATOR LIGHT AND ACTUATOR

RELATED APPLICATION DATA

The present application claims the priority of U.S. Provisional Application Ser. No. 60/186,628 entitled "Clutch Light" filed Mar. 3, 2000 by Applicant herein.

FIELD OF THE INVENTION

The present invention relates to motor vehicle indicator lights. Specifically, the present invention is an indicator light system actuated when the clutch pedal of a motor vehicle is depressed.

BACKGROUND OF THE INVENTION

It is appreciated in the art that one of the best ways to reduce the incidence of motor vehicle collisions is to provide warnings to other drivers through the use of indicator lights. To this end, all motor vehicles include brake indicator lights, turn signal indicator lights, reverse indicator lights, and the like, to warn other drivers of changes in the speed and/or direction of a motor vehicle.

For example, changes in speed of a motor vehicle, specifically deceleration of a motor vehicle, are intended to be indicated by brake indicator lights. However, brake indicator lights actually only signal depression of the brake pedal. While stopped, a driver may release pressure on the brake pedal thereby extinguishing the brake indicator lights but allowing the motor vehicle to remain stopped. Likewise, a driver may decelerate a motor vehicle by shifting the motor vehicle's transmission to a lower gear rather than depressing the brake pedal. Unless the driver additionally depresses the brake pedal, the brake indicator lights do not warn other drivers of this "downshifting" type of deceleration.

Warning systems have been proposed to more accurately alert other drivers to the speed and direction of motor vehicles. For example, U.S. Pat. No. 4,806,782 to Bernal discloses a system in which the speed of a motor vehicle is sensed and the motor vehicle's brake indicator lights are illuminated when the speed of the motor vehicle drops below a predetermined level.

While such a system addresses the problem of alerting other drivers to a driver releasing a brake pedal while traveling at a slow speeds, i.e. coasting, or while stopped, this system has at least one drawback. The drawback to this system is that, as described above, alerting drivers to the speed of a vehicle does not address the problem of alerting other drivers to changes in speed of a motor vehicle. That is, the safety problem has less to do with the absolute speed of a motor vehicle than with changes in speed, specifically deceleration, of a motor vehicle. The system of Bernal does not alert other drivers to such deceleration until the absolute speed of the motor vehicle drops below the predetermined level. As with conventional brake indicator lights, in many instances, this warning may come too late.

Therefore, it can be seen that there is a need in the art for a warning system for a motor vehicle that alerts other drivers to the deceleration of a motor vehicle caused by actions other than depressing the brake pedal.

SUMMARY OF THE INVENTION

The present invention is a motor vehicle indicator light. The present device is adapted for use with a motor vehicle of the type having a manual transmission and an electrical system. As is known in the art, the manual transmission includes a clutch engaging and disengaging the gears of the manual transmission when a clutch pedal coupled to the clutch is released and depressed respectively.

According to the present invention, exterior indicator lights proximate the rear of the motor vehicle communicate electrically with the electrical system of the motor vehicle. Optionally, the present invention may additionally include a dashboard indicator light in electrical communication with the motor vehicle electrical system. The present invention includes an actuator engaged to said clutch that communicates with the exterior indicator lights. When the clutch pedal is depressed, the actuator actuates the exterior indicator lights. In the optional embodiment in which a dashboard indicator light is provided, the actuator additionally actuates the dashboard indicator light when the clutch pedal is depressed.

DESCRIPTION

Figure 1:
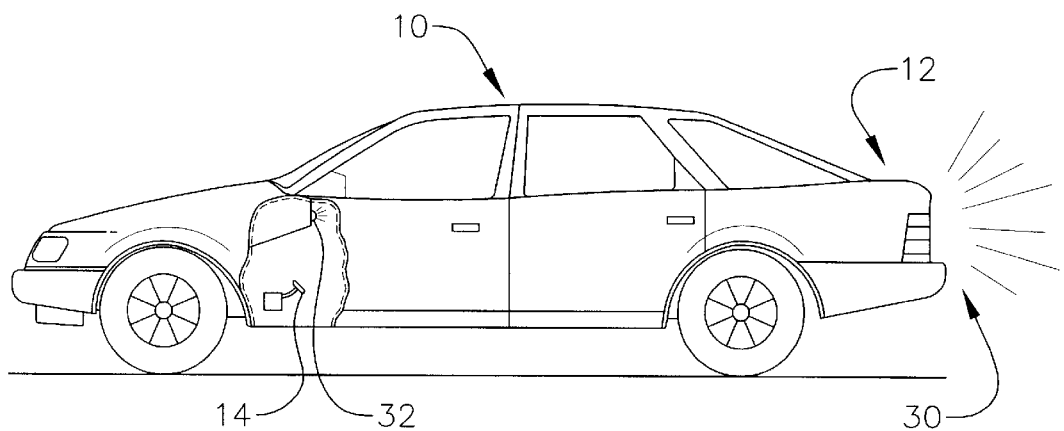
FIG. 1 is a side view of a motor vehicle with an actuator and indicator light according to an embodiment of the present invention.

Reference is now made to the figures wherein like parts are referred to by like numerals throughout. Referring to FIGS. 1–4, the present invention is adapted for use on a motor vehicle 10 having an electrical system 20 with a power source 22 electrically communicating with exterior indicator lights 30 proximate the rear 12 of the motor vehicle 10. As is well known in the art, the power source 22 may take the form of a battery, alternator, generator, or the like. The power source 22 communicates with the exterior indicator lights 30 through conventional electrical wires. The exterior indicator lights 30 additionally communicate with an actuator 40 described in greater detail below.

The exterior indicator lights 30 may be those already incorporated into the motor vehicle 10, such as the brake indicator lights 34, may be additional lights, or may be a combination of both. Moreover, it is contemplated that the present invention could be embodied in a retrofit kit for existing motor vehicles 10 in which the existing exterior indicator lights 30 are utilized and, alternatively, included in the original equipment of a manufactured motor vehicle 10 in which the invention utilizes the existing exterior indicator lights 30 or altogether new exterior indicator lights 30 installed expressly for the present invention.

Figure 2:
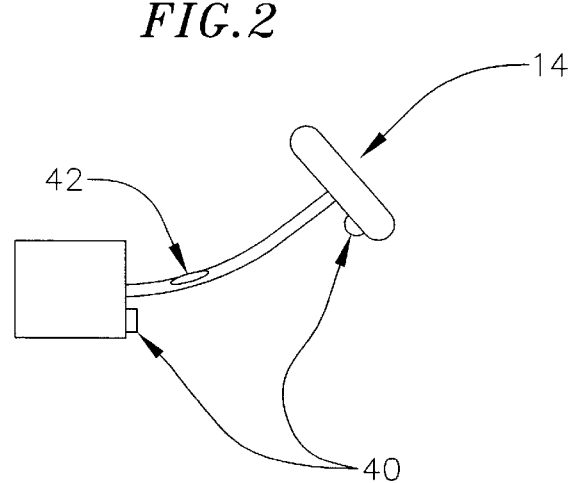
FIG. 2 is an enlarged section view of a clutch pedal with an actuator according to the embodiment of FIG. 1.

With particular reference to FIGS. 1 and 2, in an optional embodiment, a dashboard indicator light 32 in communication with said motor vehicle electrical system 20 may be provided. The optional dashboard indicator light 32 may be a light emitting diode ("LED"), conventional luminescent lamp, or the like. The dashboard indicator light 32 electrically communicates with the power source 22 of the electrical system 20 and to the actuator 40 described in more detail below.

The present invention is specially adapted for use with motor vehicles 10 having manual transmissions. Briefly stated, manual transmissions include a clutch pedal 14 controlling the transmission clutch that engages and disengages the gears of the transmission to change the gear ratio between the engine and the drive shaft. In conventional use, shifting gears is accomplished by depressing the clutch pedal 14 to disengage the gears, selecting the new gear using the gear selector, and releasing the clutch pedal 14 to engage the new gear. As alluded to above, downshifting is a technique in which the compression and inertia of the engine in lower gears is used to decelerate a motor vehicle.

According to the present invention, an actuator 40 engaged to the clutch is provided. The actuator 40 may be engaged to the clutch itself, the clutch pedal 14, or the linkages or cables connecting the clutch pedal 14 to the clutch so long as the actuator 40 can sense when the clutch pedal 14 has been depressed.

The actuator 40 itself may take a variety of forms including that of an analog switch, rheostat, digital switch, pressure switch, or the like. In the example shown in the figures, the actuator 40 is an analog switch engaged to the clutch pedal 14. The actuator 40 may additionally include an in-line fuse 42 to interrupt power in a controlled fashion.

The actuator 40 is in electrical communication with the exterior indicator lights 30. In an optional embodiment including a dashboard indicator light 32, the actuator 40 also communicates electrically with the dashboard indicator light 32. In an optional embodiment, the actuator 40 controls the flow of electricity from the electrical system 20, and more specifically the power source 22, to at least one of the exterior indicator lights 30 and the optional dashboard indicator light 32.

Figure 3:
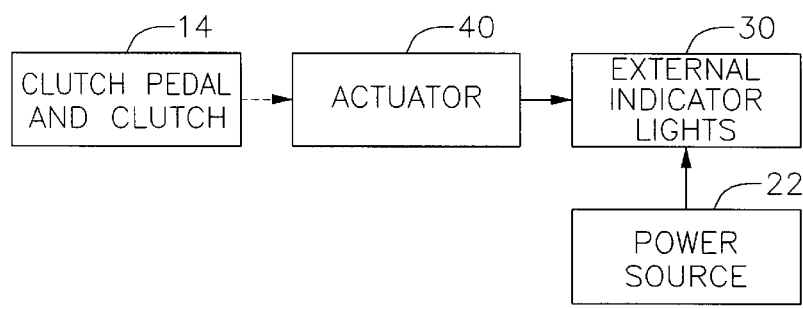
FIG. 3 is a block diagram of an actuator and indicator light according to an embodiment of the present invention.
Figure 4:
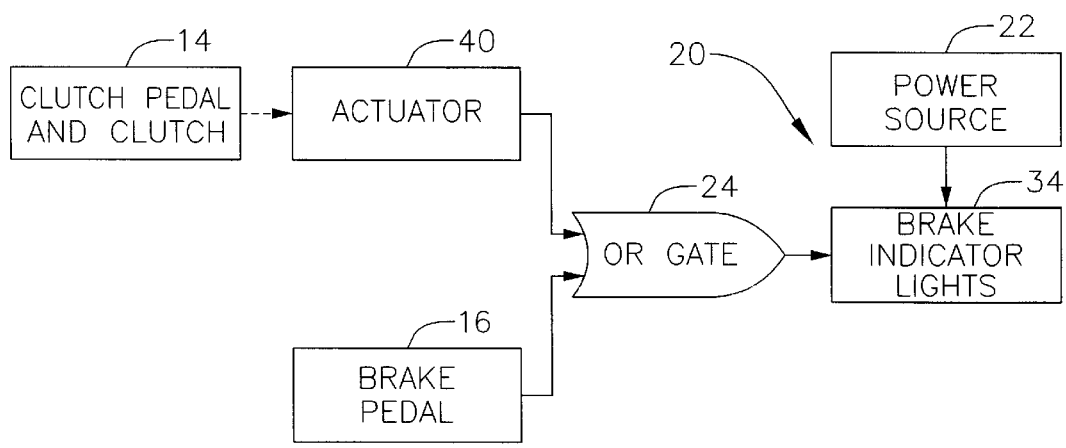
FIG. 4 is a block diagram of an actuator and indicator light according to an alternate embodiment of the present invention.

With reference to FIGS. 3 and 4, in use, the motor vehicle 10 is driven in a conventional fashion. When the clutch pedal 14 is depressed, the actuator 40 directs actuation, i.e. illumination, of the exterior indicator lights 30 and optional dashboard indicator light 32 with which it communicates. In this fashion, when a driver depresses the clutch pedal 14 to downshift, other drivers are alerted to the impending deceleration by the illumination of the exterior indicator lights 30. Similarly, the illumination of the optional dashboard indicator light 32 alerts the driver to the depression of the clutch pedal 14 and may serve as a reminder for the driver to release the clutch pedal 14 to prevent damage to the clutch. When the clutch pedal 14 is subsequently released, the actuator 40 directs deactivation of the exterior indicator lights 30 and optional dashboard indicator light 32 with which it communicates.

It is important to note that actuation of the exterior indicator lights 30 in response to other input, such as actuation of the brake pedal 16, is not affected by the addition of the actuator 40 of the present invention. That is, in the optional embodiment shown in FIG. 4 in which the actuator 40 communicates with the brake indicator lights 34, actuation of the brake indicator lights 34 is controlled by an "OR" gate 24 in which either or both inputs (brake pedal 16 and/or clutch pedal 14) will cause actuation of the brake indicator lights 34.

While certain embodiments of the present invention have been shown and described it is to be understood that the present invention is subject to many modifications and changes without departing from the spirit and scope of the claims presented herein.

I claim:

1. A device for a motor vehicle, the motor vehicle of the type having an electrical system including brake lights at a rear end of said motor vehicle and a manual transmission, the manual transmission including a clutch engaging and disengaging the gears of the manual transmission when a clutch pedal coupled to said clutch is released and depressed respectively, comprising:

exterior indicator lights proximate the rear end of said motor vehicle in electrical communication with said electrical system said exterior indicator lights separate and independent of said brake lights; and an actuator engaged to said clutch, the actuator communicating with one or more of said indicator lights to immediately actuate one or more of said indicator lights when said clutch pedal is depressed.

2. The device of claim 1 further comprising a dashboard indicator light in electrical communication with said electrical system, said exterior indicator lights, and said actuator whereby said actuator actuates said dashboard indicator light when said clutch is depressed simultaneous with the actuation of said exterior indicator lights.

3. A device for a motor vehicle, the motor vehicle of the type having an electrical system including brake lights at a rear end of said motor vehicle and a manual transmission, the manual transmission including a clutch engaging and disengaging the gears of the manual transmission when a clutch pedal coupled to said clutch is released and depressed respectively, comprising:

a dashboard indicator light in electrical communication with said electrical system;

exterior indicator lights proximate the rear end of said motor vehicle in electrical communication with said electrical system said exterior indicator lights separate and independent of said brake lights; and an actuator engaged to said clutch, the actuator controlling the flow of electricity from said electrical system to one or more of said indicator lights and said dashboard indicator light, said actuator immediately actuating one or more of said indicator lights and simultaneously actuating said dashboard indicator light when said clutch pedal is depressed.

* * * * *